United States Patent
Natarajan

(10) Patent No.: US 8,494,822 B2
(45) Date of Patent: *Jul. 23, 2013

(54) METHOD FOR JOINT MODELING OF MEAN AND DISPERSION

(75) Inventor: Ramesh Natarajan, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/616,472

(22) Filed: Sep. 14, 2012

(65) Prior Publication Data

US 2013/0006594 A1    Jan. 3, 2013

Related U.S. Application Data

(63) Continuation of application No. 12/546,290, filed on Aug. 24, 2009, now Pat. No. 8,340,945.

(51) Int. Cl.
*G06F 17/10*    (2006.01)

(52) U.S. Cl.
USPC .......................................................... 703/2

(58) Field of Classification Search
USPC .......................................................... 703/2
See application file for complete search history.

(56) References Cited

PUBLICATIONS

Friedman, J. H. "Greedy Function Approximation: A Gradient Boosting Machine", Annals of Statistics, 2001, pp. 1189-1232, vol. 29 (5).
Goutis, C. et al., "Explaining the Saddlepoint Approximation", The American Statistician, 1999, pp. 216-224, vol. 53 (3).
Bailey, R. A., et al., "Two studies in automobile insurance ratemaking", Astin Bulletin, 1960, pp. 192-217, vol. 1.
Chan, D., et al., "Locally Adaptive Semiparametric Estimation of the Mean and Variance Functions in Regression Models", American Statistical Association, Institute of Mathematical Statistics and Interface Foundation of North America, Journal of Computation and Graphical Statistics, 2006, pp. 915-936, vol. 15, No. 4.
Mano, C., et al., "Use of Classification Analysis for Grouping Multilevel Rating Factors", 28th International Congress of Actuaries, 2006, Paris.
Friedman, J. H., "Stochastic Gradient Boosting", Technical Discussion of TreeNet (TM), Mar. 26, 1999.
Heller, G., et al., "Mean and dispersion modelling for policy claims costs", Scandinavian Actural Journal, 2007, pp. 281-292, vol. 107(4).
Jorgensen, B., et al., "Fitting Tweedie's Compound Poisson Model to Insurance Claims Data", Scand. Actuarial J. 1994; 1:69-63.
Juutilainen, I., et al., "A Comparison of Methods for Joint Modelling of Mean and Dispersion", ASMDA 2005, 2005.

(Continued)

*Primary Examiner* — Hugh Jones
(74) *Attorney, Agent, or Firm* — Scully, Scott, Murphy & Presser, P.C.; Daniel P. Morris, Esq.

(57) ABSTRACT

The present invention describes a system and a computer program product for joint modeling of a mean and dispersion of data. A computing system derives a loss function taking into account distributional requirements over the data. The computing system represents separate regression functions for the mean and the dispersion as stagewise expansion forms. At this time, the stagewise expansion forms include undetermined scalar coefficients and undetermined basis functions. Then, the computing system chooses the basis functions that maximally correlate with a corresponding steepest-descent gradient direction of the loss function. The computing system obtains the scalar coefficients based on a single step of Newton iteration. The computing system completes the regression functions based on the chosen basis functions and obtained scalar coefficients.

10 Claims, 3 Drawing Sheets

PUBLICATIONS

Nelder, J. A., et al., "An extended quasi-likelihood function", Biometrika, 1987, pp. 221-232, 74, 2, Great Britain.

Renshaw, A. E., "Modelling the Claims Process in the Presence of Covariates", Astin Bulletin, 1994, vol. 24, No. 2.

Smyth, G. K., et al., "Exact and Approximate REML for Heteroscedastic Regression" Statistical Modelling, 2001, 1, 161-175.

Aitkin, M., "Modeling Variance Heterogeneity in Normal Regression Using GLM", App. Statist, 1987, pp. 332-339, vol. 36(3).

Green, P. J., "Iteratively Reweighted Least Squares for Maximum Likelihood Estimation, and some Robust and Resistant Alternatives," Journal of the Royal Statistical Society, 1984, pp. 149-192, vol. 46(2).

Smyth, G. K., et al., "Generalized Linear Models With Varying Dispersion", J. Royal Statist., Soc. B., 1989, pp. 47-60, vol. 51(1).

Juutilainen et al., "Modeling conditional variance function in industrial data: A case study"; Statistical Methodology 5 (2008) 564-575.

Li, B. and Goel, P.K. (2007). Additive Regression Trees and Smoothing Splines—Predictive Modeling and Interpretation in Data Mining. Contemporary Mathematics, 443: 83-1 01 (numbered as pp. 1-1 9).

Juutilainen; Modelling of Conditional Varianceand Uncertainty Using Industrial Process Data; Ph D Thesis, 2006; Oulu University Press, Oulu 2006; pp. 1-78.

Ward, Gillian; Statistics in Ecological Modeling; Presence-Only Data and Boosted Mars; PhD Thesis; 912007.

Kriegler; Cost-Sensitive Stochastic Gradient Boosting Within a Quantitative Regression Framework; PhD Thesis; pp. 1-1 61; 2007.

Iooss et al.; Global sensitivity analysis of stochastic computer models with generalized additive models; 212008; arXiv:0802.0443v3 [stat.ME]; pp. 1-29.

METHOD FOR JOINT MODELING OF MEAN AND DISPERSION

CROSS REFERENCE TO RELATED APPLICATION

This application is a continuation of U.S. patent application Ser. No. 12/546,290, filed Aug. 24, 2009, the entire content and disclosure of which is incorporated herein by reference.

BACKGROUND

The present invention generally relates to modeling data. More particularly, the present invention relates to joint modeling of a mean and a dispersion of the data.

The joint modeling of a mean and dispersion refers to estimating the mean and the dispersion concurrently. The estimated mean and dispersion may or may not depend on each other. The (sample) mean is a measure of the central value of the data, and generally refers to an average value among sample data drawn from a population, e.g., a set of data about which statistical inferences are to be drawn. The (sample) dispersion is a measure of the spread of the data about its central value, and is generally measured by at least one or more of: (1) Range, (2) Mean absolute deviation, (3) Standard deviation, (4) Variance and (5) Covariance, etc. The range refers to the difference between a largest value and a smallest value among the sample data. If the sample data is composed of $x_1, x_2, \ldots, x_n$, then the mean, m, is $(x_1+x_2+\ldots+x_n)/n$. The mean absolute deviance is $(|x_1-m|+|x_2-m|+\ldots+|x_n-m|)/n$. The standard deviation is a square root of the variance, and the variance is $\{(x_1-m)^2+(x_2-m)^2+\ldots+(x_n-m)^2\}/n$. When two variables, x and y, are independent of each other, the covariance of them is 0. Generally, the variance of $(x+y)$, $\text{Var}(x+y)$, is $\text{Var}(x)+\text{Var}(y)+2*\text{Cov}(xy)$, where $\text{Cov}(xy)$ refers to the covariance of $(x*y)$. $\text{Cov}(xy)$ is $\{x_1y_1+x_2y_2+\ldots+x_ny_n\}/n-\text{mean}(x)*\text{mean}(y)$, where x is $\{x1, x2, \ldots, x_n\}$, y is $\{y_1, y_2, \ldots, y_n\}$, n is the number of elements in x or y, mean(x) is the mean of x and mean (y) is the mean of y. The covariate refers to a possibly predictive variable that is related to an outcome of a modeling.

In regression applications (e.g., linear regression) involving a conditional response distribution from the exponential dispersion family, a primary interest is typically in a regression model for the mean parameter. The corresponding dispersion parameter is either a fixed constant (e.g., a unity for the Poisson and Bernoulli distributions), or is an unspecified constant that is estimated from residual deviance values of the mean regression model. The linear model refers to any approach to modeling relationship between one variable (or possibly more variables) termed the response and denoted by y and one or more variables termed the covariates denoted by x, such that the model depends linearly on an unknown parameters to be estimated from sample data. The conditional response distribution refers to distributional changes of y across the sample data for fixed values of the covariates x. A sample mean and variance (i.e., a measure of the central value and the spread about the central value) are statistics computed from sample data. The sample mean is an estimate of the mean parameter (μ) of the population from which the sample data are drawn. The residual deviance value refers to a measurement of deviance contributed from each sample data. Regression models are used to predict one variable, termed the response, from one or more other variables termed the covariates. Regression models provide a user with predictions about past, present or future events to be made with sample data about past or present events. Mean regression refers to a tendency that statistical outliers regress toward the mean when sample data is tested over and over again. Regressing toward the mean refers to a relation between a value of a variable x and a value of y from which the most probable value of y can be predicted for any value of x. Regression refers to a process for determining a line or curve that best represent a general trend of sample data.

An assumption of constant dispersion implies that the mean and variance of the conditional response distribution have some fixed and unchanging relationship as a function of the covariates, even though in many cases these quantities can plausibly vary quite independently. Although modeling of a dispersion parameter (i.e., the sample dispersion is an estimate of a dispersion parameter (φ) of a population from which the sample data are drawn) may not be a primary goal of the regression application, one consequence of any variability in the dispersion parameter is that non-constant case weights (i.e., weights for a non-constant dispersion parameter) are required in deviance loss functions used for the mean regression. Therefore, an accurate estimation of dispersion variability will result in tighter confidence bounds for parameter estimates in mean regression, as the data associated with the larger dispersion values will be appropriately down-weighted in terms of their contribution to the deviance loss function. However, the regression models for the mean and dispersion parameters cannot be obtained independently, or even sequentially, since their estimation is intrinsically coupled in likelihood-based formulations used for regression modeling. The deviance loss function refers to a function that that not only measures how close dispersion parameters are to their expected values, but also measures how well dispersion parameters correspond with dispersions of residuals. The likelihood-based formulations are functions of parameters of a statistical model that plays an important role in statistical inference. Statistical inference or statistical induction comprises uses of statistics and random sampling to make inferences concerning some unknown aspect of a population.

Traditionally, GLM (General Linear Model), which is widely used for mean regression modeling, has been used for conditional response distributions from the exponential dispersion family. The GLM is a statistical linear model for a suitable transformation of the mean, term the link transformation. The GLM may be represented as $g(Y)=XB+U$, where Y is a vector with series of response measurements, g(.) is the link function that is chosen appropriately for the assumed response distribution, X is a design matrix, B is a vector including parameters to be estimated, and U is a vector including errors and noises. The design matrix refers to a matrix of explanatory variables (one or zeroes, or reals), that represents a specific statistical or experimental model). However, a traditional methodology such as the GLM cannot perform joint modeling of the mean and the dispersion without inventing additional art, particularly in the case when the covariates in the data are complex, and must be simplified and grouped in a preprocessing step that considerably detracts from the quality of resulting model.

Therefore, it is highly desirable to provide a system and method to perform joint modeling of a mean and dispersion suitable for a wide variety of data sets without requiring any preprocessing and grouping of the sample data.

SUMMARY OF THE INVENTION

The present invention describes a system and a computer program product for perform joint modeling of a mean and dispersion by extending MART (Multiple Additive Trees) methodology or extending the GLM methodology.

In one embodiment, there is provided a computer-implemented method for performing joint modeling of a mean and dispersion of data, the method comprising:

deriving a suitable loss function characterized over the data taking into account distributional details of the data;

representing regression functions for the mean and the dispersion as stagewise expansion forms, the stagewise expansion forms including undetermined scalar coefficients and undetermined basis functions;

choosing the basis functions that maximally correlate with a corresponding steepest-descent gradient direction of the loss function;

obtaining the scalar coefficients based on a single step of Newton iteration; and completing the regression functions based on the chosen basis functions and obtained scalar coefficients.

In one embodiment, there is provided a computer-implemented system For performing joint modeling of a mean and dispersion of data, the system comprising:

a memory device; and a processor unit in communication with the memory device, the processor unit performs steps of:

deriving a suitable loss function characterized over the data taking into account distributional details of the data;

representing regression functions for the mean and the dispersion as stagewise expansion forms, the stagewise expansion forms including undetermined scalar coefficients and undetermined basis functions;

choosing the basis functions that maximally correlate with a corresponding steepest-descent gradient direction of the loss function;

obtaining the scalar coefficients based on a single step of Newton iteration; and completing the regression functions based on the chosen basis functions and obtained scalar coefficients.

In a further embodiment, the processor unit further performs a step of: modifying parameters used for the obtaining the scalar coefficients to ensure that the single step of the Newton iteration is a steep-descent gradient direction for the obtained scalar coefficients, to introduce numerical stability the computations.

In a further embodiment, the processor unit further performs a step of: modifying parameters used for the obtaining the scalar coefficients to achieve a decrease in the loss function for the obtained scalar coefficients.

In a further embodiment, the chosen basis functions are regression trees computed using a least-square splitting criterion.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
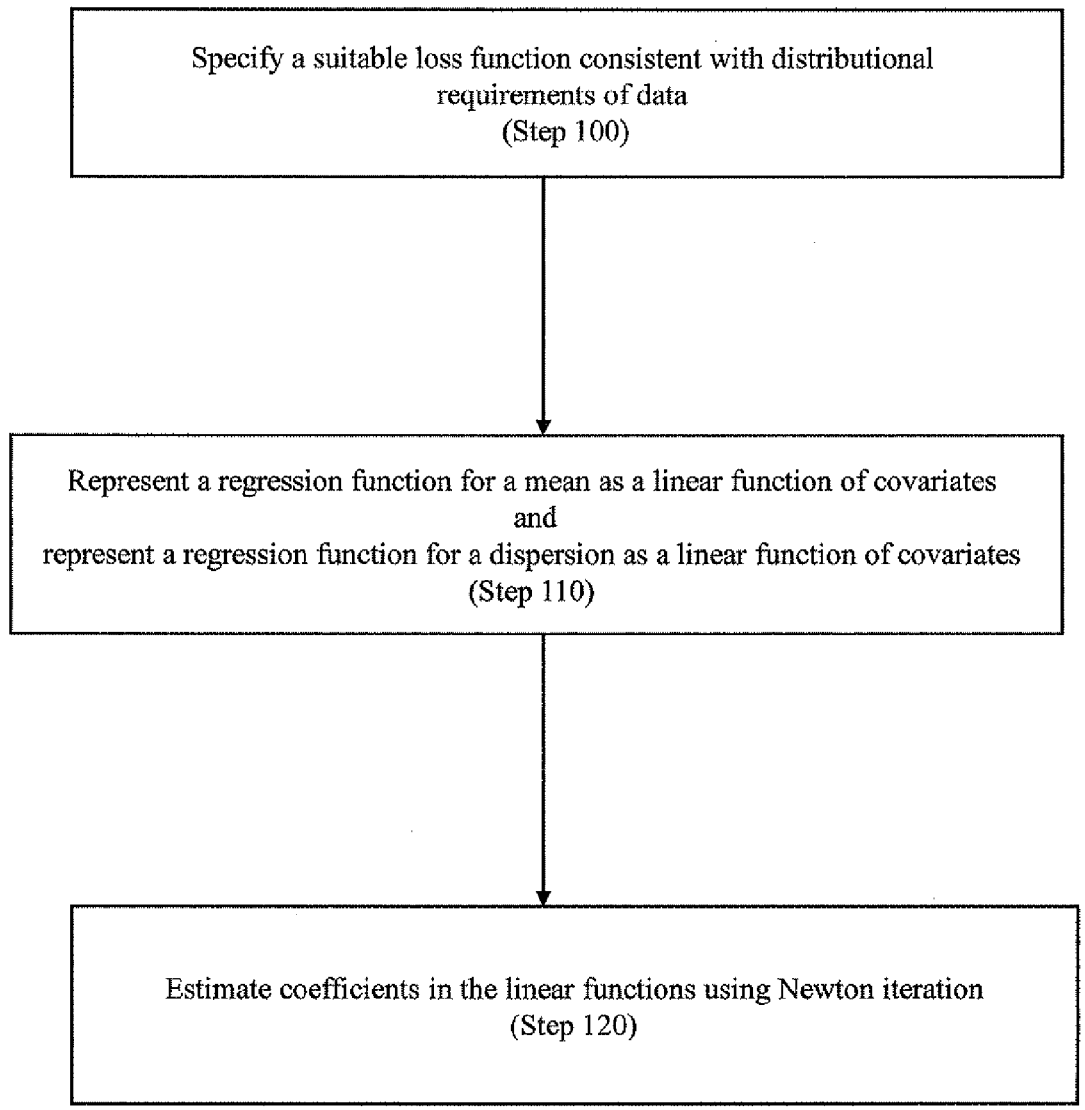
FIG. 1 illustrates a flow chart describing method steps for performing a joint modeling of a mean and dispersion by extending GLM according to one embodiment of the present invention.

MART™ is an implementation of a gradient tree boosting method for predictive data mining (regression and classification) described in "Greedy Function Approximation: A Gradient Boosting Machine", J. H. Friedman, Annals of Statistics, Vol. 29 (5), 2001, pp. 1189-1232, wholly incorporated by reference as if set forth herein, hereinafter "Friedman", describe the MART in detail. Gradient tree boosting method refers to computing a sequence of simple trees, where each successive tree is built for prediction residuals of a preceding tree.

According to one embodiment of the present invention, a computing system (e.g., a computing system 1600 depicted in FIG. 3) receives as input programmed instructions for performing a joint modeling of a mean and dispersion by extending the MART methodology or extending GLM methodology. Especially, the computing system 1600 performs joint regression of the mean and dispersion for a conditional response distribution (e.g., Inverse Gaussian distribution) from an exponential dispersion family (i.e., Gamma, Normal and Inverse Gaussian distributions). The joint regression of the mean and dispersion refers to estimating regression functions of the mean and dispersion concurrently. A regression function describes a relationship between a dependent variable Y and explanatory variable(s) X. The computing system 1600 may estimate a regression function g( ) in a model, e.g., a linear model $g(Y_i)=X_iB+e_i$, where the $e_i$ are residuals or errors. The Gamma, Normal and/or inverse Gaussian distributions are continuous distributions from the exponential distribution family for which the likelihood takes a specific simple form, e.g., a likelihood function, l( ), where:

$$l(y; \mu, \phi) = \frac{1}{2}[\phi^{-1}d(\mu) - \hat{s}(\phi^{-1}) - \hat{t}(y)],$$

where φ is a dispersion parameter, d( ) is a deviance function that returns a deviance from a distribution with a mean parameter μ, and ŝ( ) and t̂( ) are certain functions such as log( ). The computing system 1600 performs the joint regression by extending the MART methodology or the GUM to incorporate dispersion modeling (i.e., estimating dispersion φ).

The present invention thus provides: (1) An easy incorporation of relevant nonlinear and low-order covariate interaction effects in regression functions by representing the regression functions as piecewise-constant, additive and non-linear function (nonlinear effects implies that a covariate enters into a regression function not only as a linear term $X_i$, but also as nonlinear terms such as $X_i^2$ etc.; interaction effects are the nonlinear terms such as $X_iX_j$, etc.) (2) Robust and computationally-efficient modeling procedures suitable for large, high-dimensional data sets (high-dimensional refers to the number of covariates that may be in data, many of which may be collinear with existing variables or irrelevant variables for a modeling of a mean or dispersion of the data) to the by using methods that intrinsically exclude collinear and irrelevant covariates while performing the joint modeling (collinear covariates are equivalent to highly correlated variables that add no new useful information; irrelevant covariates have no correlation with the response and are hence of no use for regression modeling); and (3) An ability to use high-cardinality categorical covariates, e.g., in insurance data sets there are covariates such as zip code information and car model information, etc., which can takes hundreds of values, and therefore cannot directly incorporated in the existing regression methods without any preprocessing or grouping of levels for this covariate, in order to have computational tractability in the modeling procedures. For example, the insurance data may include high-cardinality categorical features such as zip code, occupation code, car model type, etc. The computing system 1600 estimates regression functions for a mean and dispersion of the insurance data without preprocessing and grouping of the insurance data.

[1. Properties of Exponential Dispersion Family Distributions (EDs)]

A random variable $Y \sim ED^*(\theta, \phi)$ from an univariate exponential dispersion family with a canonical parameter $\theta$ (i.e., a parameter which is a function of the mean and a function of the variance; a canonical parameter for Possion distribution is $\log_e(v)$ where v is a variance of the distribution) and a dispersion parameter $\phi > 0$ has a probability density function $$f(y;\theta,\phi) = \exp\{y\theta - b(\theta) - a(y)\}/\phi - c(y,\phi)\}, \quad (1)$$

where $y \in \text{Range}(Y)$, $b(\theta)$ is called a cumulant function, and $a(y)$ and $c(y, \theta)$ are certain functions such as formulas (15) that will be described herein. A cumulant generating function (i.e., a function generating cumulants of a random variable; a logarithm of a moment generating function; the moment generating function of a random variable X is $M_x(t) := E(e^{rX})$, where r is a variable) of the formula (1) is given by $$K_Y(t) \equiv \log E(e^{tY}) = b(\theta + \phi t) - b(\theta)/\phi, \quad (2)$$

where $E(\cdot)$ is a function calculating an expected value and t is a parameter, and from identities $K'_Y(0) = E(y)$; $K''_Y(0) = \text{Var}(Y)$, where $\text{Var}(\cdot)$ is a variance function calculating a variance, we have $$E(Y) = b'(\theta), \text{Var}(Y) = \phi b''(\theta). \quad (3)$$

Thus, if $\mu$ denotes the mean parameter, then from the formula (3) $\mu = b'(\theta)$, where $b'(\cdot)$ is an invertible mean-value mapping (i.e., a mapping between the canonical parameter and the mean parameter is an invertible change of the parameters), and its inverse $b'^{-1}(\cdot)$ is termed a canonical link function. A link function serves to link a random or stochastic component of a model, a probability distribution of a response variable, to a systematic component of a model (e.g., a linear predictor). For example, given $E(Y) = q(v) = \beta_0 + \beta_1 x_1 + \ldots + \beta_n x_n$, $g(v)$ is a non-linear link function that links a random component, $E(Y)$, to a systematic component, $(\beta_0 + \beta_1 x_1 + \ldots + \beta_n x_n)$. For traditional linear models in which the random component consists of an assumption that a response variable follows the Normal distribution, a canonical link function is an identity link. The identity link specifies that an expected mean of the response variable is identical to the linear predictor, rather than to a non-linear function of the linear predictor. From the formula (3), $\text{Var}(Y) = \phi V(\mu)$, where $V(\mu) = b''(\theta) = b''(b'^{-1}(\mu)) \geq 0$ is a positive-definite variance function. (A continuously differentiable function w is positive-definite on a neighborhood of an origin D, if $w(0) = 0$ and $w(x) > 0$ for every non-zero $x \in D$. A function is negative-definite if the inequality is reversed.) The inverse mean-value mapping function $\theta = b'^{-1}(\mu)$ can be used to write $ED^*(\theta, \phi)$ in (1) in the equivalent form $ED(\mu, \phi)$, which is explicit in the two parameters $\mu$ and $\phi$ of primary interest.

Convolution Property for the $ED(\mu, \phi)$ Family

A convolution property of the exponential dispersion family yields a relationship for statistical parameters of a distribution of homogeneous sample aggregates from an underlying distribution $ED(\mu, \phi)$. The convolution property includes, but is not limited to: (1) $f*(g*h) = (f*g)*h$, where f, g, h are functions, (2) $(cf)*g = c(f*g) = f*(cg)$, where c is a constant, f and g are functions.

Consider n independent, identically distributed random variables $Y_i \in ED(\mu, \phi_i)$, where $\phi_i = \phi/\omega_i$ for $\omega_i > 0$ and i is an index, so that each $Y_i$ have a same mean, but different inverse dispersion weights (i.e., weights assigned to inverse dispersion parameters; if a dispersion parameter is $\phi$, then an inverse dispersion parameter is $1/\phi$). Then from the formula (2), the random variable $$Y = (1/\omega) \sum_{i=1}^{n} \omega_i Y_i$$

with $$\omega = \sum_{i=1}^{n} \omega_i$$

produces the cumulant generating function $$K_Y(t) = \sum_{i=1}^{n} K_{Y_i}(\omega_i t/\omega) = \frac{b(\theta + (\phi/\omega)t) - b(\theta)}{\phi/\omega}, \quad (4)$$

so that a weighted sum $$(1/\omega) \sum_{i=1}^{n} \omega_i Y_i$$

has the same distribution $Y \in ED(\mu, \phi/\omega)$ as the individual $Y_i$, with $E(Y) = \mu$, $\text{Var}(Y) = (\phi/\omega)\text{Var}(\mu)$.

A case $\omega_i = 1$ in the formula (4) with $\text{Var}(Y) = \phi \text{Var}(\mu)/n$, where is the number of sample data, is of special interest, and the $\mu$ and $\phi$ parameters for n identically distributed $Y_i \in ED^*(\mu, \phi)$ can be estimated from a distribution of an aggregate $$Y = (1/n) \sum_{i=1}^{n} Y_i,$$

since from the formula (4) Y belongs to $ED(\mu, \phi/n)$. This result is frequently used to fit exponential dispersion models (e.g., an exponential form of the GLM) to data in contingency tables, where the group averages in each cell k correspond to an aggregate distribution with mean $\mu_k$ and dispersion $\phi_k/\omega_k$, in which the weights $\omega_k$ are the known sample sizes of the aggregated data in cell k, and $\mu_k$ and $\phi_k$ are the respective mean and dispersion of an underlying distribution. The contingency tables are used to record and analyze a relationship between two or more variables, most usually categorical variables. Variables assessed on a nominal scale are called categorical variables.

For notational simplicity, $\phi_k$ has been used throughout to denote a variable dispersion parameter, but when known case weights $\omega_k$ are explicitly required, as described above, then $\phi_k$ must be replaced by $\phi_k/\omega_k$ wherever it appears.

Deviance and Negative Log-Likelihood Functions

For a random variable $Y \sim ED^*(\theta, \phi)$ with a mean $\mu$ and variance function $V(\mu) = Var(\mu)$, a deviance function $d(y, \mu)$ is defined by $$d(y, \mu) = -2 \int_y^\mu \frac{y-s}{V(s)} ds. \tag{5}$$

Thus, noting that $s = b'(t)$, $V(s) = b''(t)$, $$d(y, \mu) = -2 \int_{b'^{-1}(y)}^{b'^{-1}(\mu)} (y - b'(t)) dt = -2[y\theta - b(\theta) - a(y)]. \tag{6}$$

Comparing (6) with (1), $$a(y) = yb'-1(y) - b(b'-1(y)), \tag{7}$$

from which an identity $a'(\cdot) \equiv b'-1(\cdot)$. From the formula (6), it follows that $$\frac{\partial^2 d}{\partial y^2} = \frac{2}{V(\mu)} > 0, \tag{8}$$

so that the $d(y, \mu)$ is convex (i.e., being a continuous function or part of a continuous function) as a function of y. A deviance refers to a measure for judging an extent to which a model explains a variation in a set of data when the parameter estimation is carried out using a method of maximum likelihood. An identity refers to an equality that remains true regardless of the values of any variables that appear in the formula (7).

Similarly, $$\frac{\partial^2 d}{\partial \mu^2} = 2\left\{1 + (y-\mu)\frac{V'(\mu)}{V(\mu)}\right\}\frac{1}{V(\mu)}, \tag{9}$$

so that $d(y, \mu)$ is monotonic (i.e., a monotonic function is a function that tends to move in only one direction as value(s) of parameter(s) increase), but is non-convex (i.e., being a non-continuous function or part of non-continuous function) as a function of $\mu$ when $\mu - V(\mu)/V'(\mu) > y$. In particular, for Tweedie distributions which are a subset of the exponential dispersion family with variance function $V(\mu) = \mu^p$, the deviance is non-convex for $p > 1$ if $\mu(p-1)/p > y$. However, an Expected Value $$E\left(\frac{\partial^2 d}{\partial \mu^2}\right) = 2/V(\mu) > 0$$

of the formula (9) is always positive function of $\mu$.

From the formula (1) and (6), the negative log-likelihood function $l(y; \mu, \phi)$ for a random variable $Y \sim ED(\mu, \phi)$ can be written in the form $$l(y; \mu, \phi) = d(y, \mu)/2\phi + c(y, \phi). \tag{10}$$

Since principal minors of a Hessian of the formula (10) must be positive in order for $l(u; \mu, \phi)$ to be convex, it follows from the discussion following the formula (9), that $l(y; \mu, \phi)$ is non-convex as a function of $\mu$ and $\phi$ if either $d(y, \mu)$ is non-convex, or if $\phi > 2d(y, \mu)$. $l(y; \mu, \phi)$ can be non-convex even when the corresponding $d(y, \mu)$ is always convex (so for example, $l(y; \mu, \phi)$ is non-convex for the Normal distribution even though its deviance function $d(y, \mu)$ is always convex). Regions of non-convex geometry in the likelihood surface $l(y; \mu, \phi)$ have implications for optimization algorithms used for joint modeling of a mean and dispersion in the formula (4). if A is an m×n matrix, I is a subset of $\{1, \ldots, m\}$ with k elements and J is a subset of $\{1, \ldots, n\}$ with k elements, then $[A]_{I,J}$ for the k×k minor of A corresponds to rows with an index in I and columns with an index in J. If I=J, then $[A]_{I,J}$ is called a principal minor. Hessian (matrix) is a square matrix of second-order partial derivatives of a function. For example, given a real-valued function $f(x_1, x_2, \ldots, x_n)$, then the Hessian becomes $$H(f) = \begin{bmatrix} \frac{\partial^2 f}{\partial x_1^2} & \frac{\partial^2 f}{\partial x_1 \partial x_2} & \cdots & \frac{\partial^2 f}{\partial x_1 \partial x_n} \\ \frac{\partial^2 f}{\partial x_2 \partial x_1} & \frac{\partial^2 f}{\partial x_2^2} & \cdots & \frac{\partial^2 f}{\partial x_2 \partial x_n} \\ \vdots & \vdots & \ddots & \vdots \\ \frac{\partial^2 f}{\partial x_n \partial x_1} & \frac{\partial^2 f}{\partial x_n \partial x_2} & \cdots & \frac{\partial^2 f}{\partial x_n^2} \end{bmatrix}.$$

The Normal, Gamma and Inverse Gaussian Distributions

The Normal, Gamma and Inverse Gaussian distributions are the only members of the exponential distribution family for which $c(y, \phi)$ can be written in the form $$c(y, \phi) = \frac{1}{2}[\hat{t}(y) - \hat{s}(\phi^{-1})], \tag{11}$$

where $\hat{t}(\ )$ is a specific function such as $\log 2\pi$ and $\hat{s}(\ )$ is a specific function, e.g., $\log(\ )$. Then, the negative log-likelihood function (10) takes a special form $$l(y; \mu, \phi) = \frac{1}{2}[\phi^{-1} d(y, \mu) - \hat{s}(\phi^{-1}) - \hat{t}(y)]. \tag{12}$$

This special form leads to certain simple iterative schemes for a maximum-likelihood estimation of the mean and dispersion parameters as described below. The maximum-likelihood estimation (MLE) is a popular statistical method used for fitting a statistical model to data, and providing estimates for the model's parameters. For example, suppose a user is interested in heights of Americans. The user may have a sample of some number of Americans, but not an entire population, and record their heights. Further, the user is willing to assume that heights are normally distributed with some unknown mean and variance. The sample mean is then the maximum likelihood estimation of the mean of the population, and the sample variance is a close approximation to the maximum likelihood estimation of the variance of the population.

These distributions (i.e., Gamma, Normal and Inverse Gaussian distributions) are also members of the Tweedie family for which the variance function has a special form, $V(\mu) = \mu^p$, where p is a parameter indicating a specific distribution. For the Normal (p=0), Gamma (p=2) and Inverse Gaussian (p=3) cases, respective cumulant functions $b_p(\theta)$ can be obtained by solving $b''_p(\theta) = (b'_p(\theta))^p$ (and constants of an integration can be set to convenient simplifying values).

Similarly, respective deviance functions $d_p(y, \mu)$ can also be evaluated by substituting the corresponding variance function in the integral (5). These three cases are summarized below.

Normal Distribution, $N(\mu, \sigma)$

The Normal distribution is a $ED(\mu, \phi)$ distribution with $\phi = \sigma^2$ for which $$b(\theta) = \theta^2/2, \quad (13)$$

$$d(y,\mu) = (y-\mu)^2, \quad (14)$$

so that the canonical link function is the identity link. Then comparing the negative likelihood with the formula (10), $$a(y) = y^2/2, \; c(y, \phi) = \frac{1}{2}\log 2\pi\phi, \quad (15)$$

so that $\hat{s}(\phi^{-1}) = \log \phi^{-1}$, and from the formula (15), $\partial c/\partial \phi = (\frac{1}{2})\phi^{-1}, \partial^2 c/\partial \phi^2 = -(\frac{1}{2})\phi^{-2}$.

Gamma Distribution, $Ga(\alpha,\beta)$

The Gamma distribution is a $ED(\mu, \phi)$ distribution with $\mu = \alpha/\beta$, $\phi = 1/\alpha$, for which $$b(\theta) = -\log(-\theta), \quad (16)$$

$$d(y,\mu) = 2[y/\mu - \log(y/\mu) - 1], \quad (17)$$

so that the canonical link function is the negative reciprocal link, e.g., $-1/\theta$. From the formula (10), $$a(y) = -(1 + \log y) \quad (18)$$

$$c(y,\phi) = \phi^{-1} - \phi^{-1}\log \phi^{-1} + \log y + \log \Gamma(\phi^{-1}), \quad (19)$$

where $\Gamma$ is a Gamma function, i.e., an extension of a factorial function to real and complex number, so that $\hat{s}(\phi^{-1}) = 2[\phi^{-1}\log \phi^{-1} - \phi^{-1} - \log \Gamma(\phi^{-1})]$. In this case (Gamma distribution), to leading order for $\phi \to 0$, then $c(y, \phi) \approx (\frac{1}{2})\log(2\pi\log(2\pi\phi y^2)) + \phi/12 + O(\phi^3)$. However, $c(y, \phi)$ of the formula (19) and its required derivatives can be evaluated in terms of well-known special functions, e.g., well-known Digamma and well-known Trigamma functions, as follows $$\frac{\partial c}{\partial \phi} = \phi^{-2}[\log(\phi^{-1}) - \Psi(\phi^{-1})], \quad (20)$$

$$\frac{\partial^2 c}{\partial \phi^2} = -\phi^{-3}[1 + 2\log(\phi^{-1}) - 2\Psi(\phi^{-1}) - \phi^{-1}\Psi'(\phi^{-1})], \quad (21)$$

where $\Psi(.)$ and $\Psi'(.)$ denote the Digamma and Trigamma functions respectively.

Inverse Gaussian Distribution

The Inverse Gaussian distribution $IG(\mu, \sigma)$ is a $ED(\mu, \phi)$ distribution with $\phi = \sigma^2$, so that $$b(\theta) = 2\theta^{1/2}, \quad (22)$$

$$d(y,\mu) = [(y/\mu 2) - (2/\mu) + (1/y)], \quad (23)$$

so that the canonical link is a square reciprocal link, e.g., $$\frac{1}{\sqrt{\theta}}.$$

From the formula (10), $a(y) =$ $$-y^{-1}, \quad (24)$$

$$c(y, \phi) = \frac{1}{2}\log 2\pi\phi y^3. \quad (25)$$

Thus $\hat{s}(\phi^{-1}) = \log \phi^{-1}$, and from the formula (25), $$\partial c/\partial \phi = (\frac{1}{2})\phi^{-1}, \partial^2 c/\partial \phi^2 = -(\frac{1}{2})\phi^{-2}.$$

Relevance to Other Distributions

The form $c(y, \phi)$ in the formula (11), which is exact only for the Normal, Gamma and Inverse Gaussian distributions, also has the same form with a saddlepoint density approximation in a leading-order term for $\phi \to 0$ for other conditional response distributions from the exponential dispersion family. The saddlepoint density approximation is a formula for approximating a density function from its associated cumulant generating function. The leading-order term is an approximation to a given function, usually under assumptions about the inputs being very small or very large. The conditional response distribution is a set of measurements reflecting distributional changes across sample data.

Consider an informal derivation of the saddlepoint approximation to the likelihood for an exponential dispersion family distribution. The density function $f(y;\theta,\phi)$ of a random variable $Y \sim ED^*(\theta,\phi)$ can be represented as an inverse Fourier transform of a characteristic function with imaginary argument $\exp\{K_Y(iz)\}$ based on the formula (4), so that $$f(y; \theta, \phi) = \frac{1}{2\pi}\int_{-\infty}^{+\infty} e^{K_Y(iz)} e^{-izy} dz, \quad (26)$$

where $z$ is a parameter,

The (probability) density function is a function which describes a density of probability each point in sample data.

For a density from the exponential dispersion family, from the formula (2), after setting $\tilde{\theta} = b'^{-1}(y)$, where $\tilde{\theta}$ is the saddlepoint approximation to $\theta$, noting from the formula (7) that $a(y) = y\tilde{\theta} - b(\tilde{\theta})$, and then comparing the formula (26) with the formula (1), gives for $c(y;\phi)$ that $$c(y; \phi) = -\log \frac{1}{2\pi} \int_{-\infty}^{+\infty} e^{(b(\theta+i\phi z) - b(\tilde{\theta}) - y(\theta+i\phi z) + y\tilde{\theta})/\phi} dz \quad (27)$$

A change of variable $iz = s$ takes a line of integration to an imaginary axis in complex plane for $s$. However, since an integrand in the formula (27) is analytic and vanishes for $iz \to \pm i\infty$, a value of an inversion integral will be unaffected by translating the line of integration parallel to the imaginary axis, in particular so that it passes through a saddlepoint of an argument of the exponential (the saddlepoint of a function of two variables is defined as a point where a gradient of the function is zero, and the Hessian is indefinite, that is, the Hessian has a positive and a negative eigenvalue). Thus, using the change of variables $iz = s - (\theta - \tilde{\theta})/\phi$, so that $$c(y; \phi) = -\log \frac{1}{2\pi i}\int_{-i\infty}^{+i\infty} e^{(b(\tilde{\theta}+\phi s) - b(\tilde{\theta}) - \phi sy)/\phi} ds. \quad (28)$$

A steepest ascent method can now be used to evaluate the integral, which for leading order as $\phi \to 0$ is dominated by the contribution of the integrand in a neighborhood of the saddlepoint. The steepest ascent method is described in this context in "Explaining the Saddlepoint Approximation", C. Goutis and G. Casella, The American Statistician, Vol. 53(3), pp. 216-224, 1999, wholly incorporated by reference as if set forth here in, and involves finding approximations to line integrals in situations where a parameter in an integrand becomes small, as in (28)). Thus $$c(y;\phi) \approx -\log\frac{1}{2\pi i}\int_{-i\infty}^{+i\infty}e^{\frac{1}{2}\phi b''(\tilde{\theta})s^2}ds$$
$$= \log\sqrt{2\pi\phi V(y)}$$
$$= \tilde{c}(y;\phi),$$

in which $\tilde{c}(y;\phi)$ denotes the saddlepoint approximation to $c(y;\phi)$. Various steps in a formula (29) follow from a fact that $b(\theta)$ is at least twice-differentiable, and at a unique saddlepoint $s=0$ of $b(\tilde{\theta}+i\phi s)-b(\tilde{\theta})-i\phi s$, $b''(\tilde{\theta})=V(y)>0$ (a special case when $V(y)=0$ is addressed below).

From the formula (29), the negative log-likelihood (10) with this un-normalized saddlepoint approximation to the exact density can be written as $$l(y;\mu,\phi) \approx \frac{d(y,\mu)}{2\phi} + \log\sqrt{2\pi\phi V(y)}. \quad (29)$$

Thus the formula (29) which is valid to leading order for $\phi \to 0$, has a same form as the formula (12), with $\hat{s}(\phi^{-1}) \sim -\log\phi$.

In fact, this approximation (29) is also an exact negative log-likelihood function for the Normal and Inverse Gaussian distributions, and a renormalization of the formula (29) leads to an exact negative log-likelihood for the Gamma distribution as well. The negative log-likelihood is a negative log of a probability of an observed response. Minimizing the negative a log-likelihood function thus produces maximum likelihood estimates for a particular effect.

This saddlepoint likelihood (29) provides a computationally simpler alternative to an exact negative log-likelihood for joint estimation of $\mu$ and $\phi$ in the small dispersion ($\phi \to 0$) limit, and is equivalent to an extended quasi-likelihood function, that has been widely used in GLM modeling (albeit for more general variance functions which are not just restricted to the exponential dispersion family). The quasi-likelihood function is a function which has similar properties to log-likelihood function, except that a quasi-likelihood function is not the log-likelihood corresponding to any actual probability distribution.

For Tweedie family distributions $Tw_p(\mu,\phi)$ with $1 \leq p < 2$, i.e., specifically for the Poisson and Compound-Poisson distributions, the value y=0 is in the range of the distribution with $V(0)=0$. Tweedie distributions are a family of probability distributions which include continuous distributions such as the Normal and Gamma, a purely discrete scaled Poisson distribution, and a class of mixed compound Poisson-Gamma distributions.

Joint Regression Modeling
Loss Function for Joint Modeling

A loss function for joint regression modeling (parameters in a regression model are estimated by minimizing this loss function) is the empirical negative log-likelihood for a conditional response variable from the $ED(\mu,\phi)$ family over the training data records $\{y_i, x_i, z_i\}_{i=1}^n$. From the formula (10), this loss function is given by $$L(\mu,\phi) = \sum_{i=1}^n l(y_i;\mu_i,\phi_i) = \sum_{i=1}^n \left[\frac{d(y_i,\mu_i)}{2\phi_i} + c(y_i,\phi_i)\right]. \quad (30)$$

The regression functions for the mean and dispersion are given by $\eta(x)$ and $\zeta(z)$ respectively, where x and z denote respective vector of covariates (these two sets of individual covariates need not be mutually exclusive). Then, given suitable invertible link functions, g:Range(Y)→IR and h:IR$^+$→IR, then $$g(\mu)=\eta(x), h(\phi)=\zeta(z). \quad (31)$$

For twice-differentiable loss (30) and the link (31) functions, required parameter estimation can be carried out using Newton iteration (i.e., a method for finding successively better approximation to zeros (or roots) of a real-valued functions), which require following derivatives $$\frac{\partial l_i}{\partial \eta} = -\frac{(y_i - \mu_i)}{\phi_i V(\mu_i) g'(\mu_i)}, \quad (32)$$

$$\frac{\partial l_i}{\partial \zeta} = -\left(\frac{d_i}{2\phi_i^2} - \frac{\partial c_i}{\partial \phi_i}\right)\frac{1}{h'(\phi_i)},$$

where denoting
$d_i = d(y_i, \mu_i)$
and
$c_i = c(y_i, \phi_i)$.
Similarly, $$\frac{\partial^2 l_i}{\partial \eta^2} = \left[1 + (y_i - \mu_i)\left\{\frac{V'(\mu_i)}{V(\mu_i)} + \frac{g''(\mu_i)}{g'(\mu_i)}\right\}\right]\frac{1}{\phi_i V(\mu_i)(g'(\mu_i))^2}, \quad (33)$$

$$\frac{\partial l_i}{\partial \eta \partial \zeta} = \frac{(y_i - \mu_i)}{\phi_i^2 V(\mu_i) g'(\mu_i) h'(\phi_i)}. \quad (34)$$

$$\frac{\partial^2 l_i}{\partial \zeta^2} = \left[\left(\frac{d_i}{\phi_i^3} + \frac{\partial^2 c_i}{\partial \phi_i^2}\right) + \left(\frac{d_i}{2\phi_i^2} - \frac{\partial c_i}{\partial \phi_i}\right)\frac{h''(\phi_i)}{h'(\phi_i)}\right]\frac{1}{(h'(\phi_i))^2}. \quad (35)$$

From the formula (34), it can be seen the $\mu$ and $\phi$ parameters for an exponential dispersion family distribution are statistically orthogonal, as $E(\partial^2 l/\partial\mu\partial\phi)=0$.

A use of the canonical link $g(\mu)=b'^{-1}(\mu)$ in mean regression model leads to considerable simplification in the formulas (32)-(35), since $g'(\mu)V(\mu)=1$, $g''(\mu)V'(\mu)+g'(\mu)V'(\mu)=0$ in that case.

Joint Modeling Using GLM's
General Case

FIG. 1 illustrates a flow chart describing method steps for performing joint modeling of a mean and dispersion using GLM. At step 100, the computing system 1600 obtains a loss function such as the formula (30). Alternatively, a user may provide the loss function to the computing system 1600. At step 110, the computing system 1600 represents a regression function for the mean as a linear function of covariate (i.e., an independent variable not manipulated by an experiment but still affecting an outcome or response) and represents a regression function for the dispersion as linear function of covariate. According to one embodiment of the present invention, the GLM for mean regression modeling is extended to jointly modeling the mean and dispersion, e.g., by taking η(x) and ζ(z) to be linear functions of covariates, $$\eta(x)=\beta^T x, \zeta(z)=\gamma^T z, \qquad (36)$$

where β and γ are vectors of coefficients. Intercept terms, which correspond to constant terms in this linear function, can be incorporated in the formula (36) without changing the notation in (36) by adding a constant-valued dummy covariate to the sets of covariates x and z respectively.

At step 120, the computing system 1600 estimates the covariates or coefficients in the linear functions, e.g., using the Newton iteration. The gradient (∇) and Hessian (H) of the formula (30) with respect to model coefficients in (36) is given by $$(\nabla_\beta l)_k = \sum_{i=1}^n \left(\frac{\partial l_i}{\partial \eta}\right)_k x_i, \qquad (37)$$

$$(\nabla_\gamma l)_k = \sum_{i=1}^n \left(\frac{\partial l_i}{\partial \zeta}\right)_k z_i,$$

and $$(H_{\beta\beta})_k = \sum_{i=1}^n \left(\frac{\partial^2 l_i}{\partial \eta^2}\right)_k x_i x_i^T, \qquad (38)$$

$$(H_{\gamma\gamma})_k = \sum_{i=1}^n \left(\frac{\partial^2 l_i}{\partial \zeta^2}\right)_k z_i z_i^T,$$

$$(H_{\beta\gamma})_k = \sum_{i=1}^n \left(\frac{\partial^2 l_i}{\partial \eta \partial \zeta}\right)_k x_i z_i^T, \qquad (39)$$

These derivatives, when taken in conjunction with the formulas (32)-(35), lead to the following Newton iteration for estimating {β,γ} in the form $$\begin{bmatrix}\beta_{k+1}\\\gamma_{k+1}\end{bmatrix} = \begin{bmatrix}\beta_k\\\gamma_k\end{bmatrix} - \begin{bmatrix}(H_{\beta\beta})_k & (H_{\beta\gamma})_k\\(H_{\gamma\beta})_k & (H_{\gamma\gamma})_k\end{bmatrix}^{-1}\begin{bmatrix}(\nabla_\beta l)_k\\(\nabla_\gamma l)_k\end{bmatrix} \qquad (40)$$

Alternatively, the computing system 1600 utilizes a Fisher scoring algorithm for GLM, in which the Hessian matrix (38)-(40) is replaced by its Expectation (an approximation that becomes increasingly more accurate near an optimum solution). From the formula (34), it can be seen that a cross-derivative term in the formula (39) has an Expectation of 0, so that the Fisher scoring algorithm effectively decouples the updating of the parameters for the mean and dispersion, as follows, $$\beta_{k+1}=\beta_k-[E((H_{\beta\beta}))_k]^{-1}(\nabla_\beta l)_k, \qquad (41)$$

$$\gamma_{k+1}=\gamma_k-[E((H_{\gamma\gamma}))_k]^{-1}(\nabla_\gamma l)_k. \qquad (42)$$

Since $E((H_{\beta\beta}))$ in the formula (41) is always positive-definite, the iteration (41)-(42) will be globally convergent when $E((H_{\gamma\gamma}))$ is also positive-definite. The Fischer scoring algorithm is a form of Newton iteration used to solve maximum likelihood equations numerically. The maximum likelihood equations are statistical equations used for fitting a statistical model to sample data.

After completing the estimations of the covariates or coefficients, e.g., the formulas (40)-(42), in the linear regression functions (e.g., the formula 36), the computing system 1600 completes the linear regression functions (36) with the estimated covariates or coefficients. These regression functions (36) approximate the mean and dispersion of sample data concurrently and/or jointly.

Special Case

Consider the formulas (41)-(42) for the case of the Normal, Gamma and Inverse Gaussian distributions, where the negative log-likelihood takes the special form (12).

From the formulas (32) and (33), in this case of the Normal, Gamma and Inverse Gaussian distributions, $$E(y_i)=\mu_i, E(d_i)=\delta_i=\hat{s}(\phi_i^{-1}), \qquad (43)$$

where ˊ represents a first-order differential.
If denoting training data by $$y=[y_1,\ldots,y_n]^T, X=[x_1,\ldots,x_n]^T, Z=[z_1,\ldots,z_n]^T, \qquad (44)$$

From the formula (36), $$g(\mu)=\beta^T X, h(\phi)=\gamma^T Z. \qquad (45)$$

From the formulas (33)-(35), define diagonal matrices $$W = \text{Diag}\{\phi_i^{-1}(V(\mu_i))^{-1}(g'(\mu_i))^{-2}\}, \qquad (46)$$

$$V = \text{Diag}\left\{-\frac{1}{2}\phi_i^{-4}\hat{s}''(\phi_i^{-1})\right\}(h'(\phi_i))^{-2}\}, \qquad (47)$$

$$D = \text{Diag}\{-\phi_i^{-2}\hat{s}''(\phi_i^{-1})\}, \qquad (48)$$

where ″ represents a second-order differential and let $$d=[d((\mu_1,y_1),\ldots,d((\mu_n,y_n)]^T, \delta = [\hat{s}(\phi_1^{-1}),\ldots,\hat{s}(\phi_n^{-1}))]^T. \qquad (49)$$

Thus, denoting working responses at an iteration k by $$\hat{\mu}_k=g'(\mu_k)(y-\mu_k)+g(\mu_k), \qquad (50)$$

$$\hat{\phi}_k=h'(\phi_k)D_k^{-1}(\hat{d}_k-\delta_k)+h(\phi_k), \qquad (51)$$

the iterations in the formulas (41) and (42) can be written in a form, $$\beta_{k+1}=(X^T W_k X)^{-1}X^T W_k \hat{\mu}_k, \qquad (52)$$

$$\gamma_{k+1}=(Z^T V_k Z)^{-1}Z^T V_k \hat{\phi}_k. \qquad (53)$$

Each iteration step in the formulas (52)-(53) then corresponds to a pair of weighted least squares problems (i.e., a variant of a standard least squares problem in which each case is weighted differently which typically arises iterative methods; "Iteratively Reweighted Least Squares for Maximum Likelihood Estimation, and some Robust and Resistant Alternatives," P. J. Green, Journal of the Royal Statistical Society, Volume 46(2), pages 149-192, 1984, wholly incorporated by reference as if set forth herein, describes the weighted least square problems in an iterative setting in detail.), in which the working responses (50)-(51), and the weight vectors $W_k$, $V_k$ in (48) are updated at each iteration.

An overall convergence of the iteration can be improved by using the most recently updated values $\mu_{k+1}$ from a half-step (52) (i.e., half processing of the formula (52)) to obtain the working response and weight vector in order to solve for $\phi_{k+1}$ from a half-step (53). In this way, the iteration alternates between the formulas (52) and (53), always using the most recent updates in each half-step of the iteration.

The formula (53) used to update the dispersion parameter sub-model (i.e., a formula or model calculating the dispersion parameter) can be interpreted as GLM model in its own right, since the negative log-likelihood in the formula (12) can be regarded as a "pseudo-deviance," which has a same form as the formula (6), after interpreting a deviance residual d as a response, $\phi^{-1}$ as the canonical parameter, and $\hat{s}(\phi^{-1})$ as the cumulant function respectively.

The Gamma distribution (described supra) is the only case where the formula (12) holds with a non-trivial form for $\hat{s}(\phi^{-1})$, with the formula (19)

$$\hat{s}'(\phi_i^{-1})=2[\log \phi_i^{-1}-\Psi(\phi_i^{-1})], \hat{s}''(\phi_i^{-1})=2[\phi_i-\Psi'(\phi_i^{-1})]. \quad (54)$$

In the case of the Normal and Inverse Gaussian distributions, $\hat{s}(\phi^{-1})=\log \phi_i^{-1}$. Then from the formula (43), $E(d_i)=\phi_i$ and $-\phi_i^{-2}\hat{s}''(\phi^{-1})=1$, so that in this case $D_k$ in the formula (51) can be set to the identity matrix, with other simplifications in $V_k$ as well. Therefore, an iteration for the dispersion sub-model is equivalent to the Fisher scoring algorithm for a response $d_i$ using a GLM for which $E(d_i)=\phi_i$, the Gamma variance function $V(\phi_i)=\phi_i^2$, and with a fixed dispersion parameter with value 2.

Alternatively, the special form (e.g., the formula (12) of the likelihood function in these cases (i.e., the Normal, Gamma and Inverse Gaussian distributions) suggests that existing GLM macros (i.e., a rule or pattern that specifies how a certain input sequence should be mapped to an output sequence according to GLM) can be used to handle joint modeling of the mean and dispersion. The mean and dispersion sub-models in the formulas (52)-(53) are equivalent to loss functions used in the GLM. Therefore, starting from an initial estimate of $\phi$, the computing system 1600 alternates between solving a GLM model for $\mu$ with $\phi$ held fixed, followed by the GLM for $\phi$ with $\mu$ held fixed (the latter GLM will use standard macros that are available for performing Gamma regression in the Normal and Inverse Gaussian cases). Although this decoupled approach simplifies programming by making use of existing GLM macros in statistical packages, a convergence is likely to be slower than the tightly-coupled iterations used in the formulas (52) and (53).

Joint Modeling of Mean using MART

The MART methodology for regression modeling can also be extended for joint modeling applications (i.e., joint modeling of a mean and dispersion) as follows. Let $\eta_0$ and $\eta_0$ denote constant offsets, and denoting the sample response mean by $\bar{y}$, on possible set of default values for constant offsets is $\eta_0=g(\bar{y})$, $\zeta_0=h((1/(n-1))\Sigma_i d_i(y_i, \bar{y}))$, where n is an arbitrary variable. These values ($\eta_0$ and $\zeta_0$) correspond to the maximum saddlepoint likelihood estimates for unconditional response.

Figure 2:
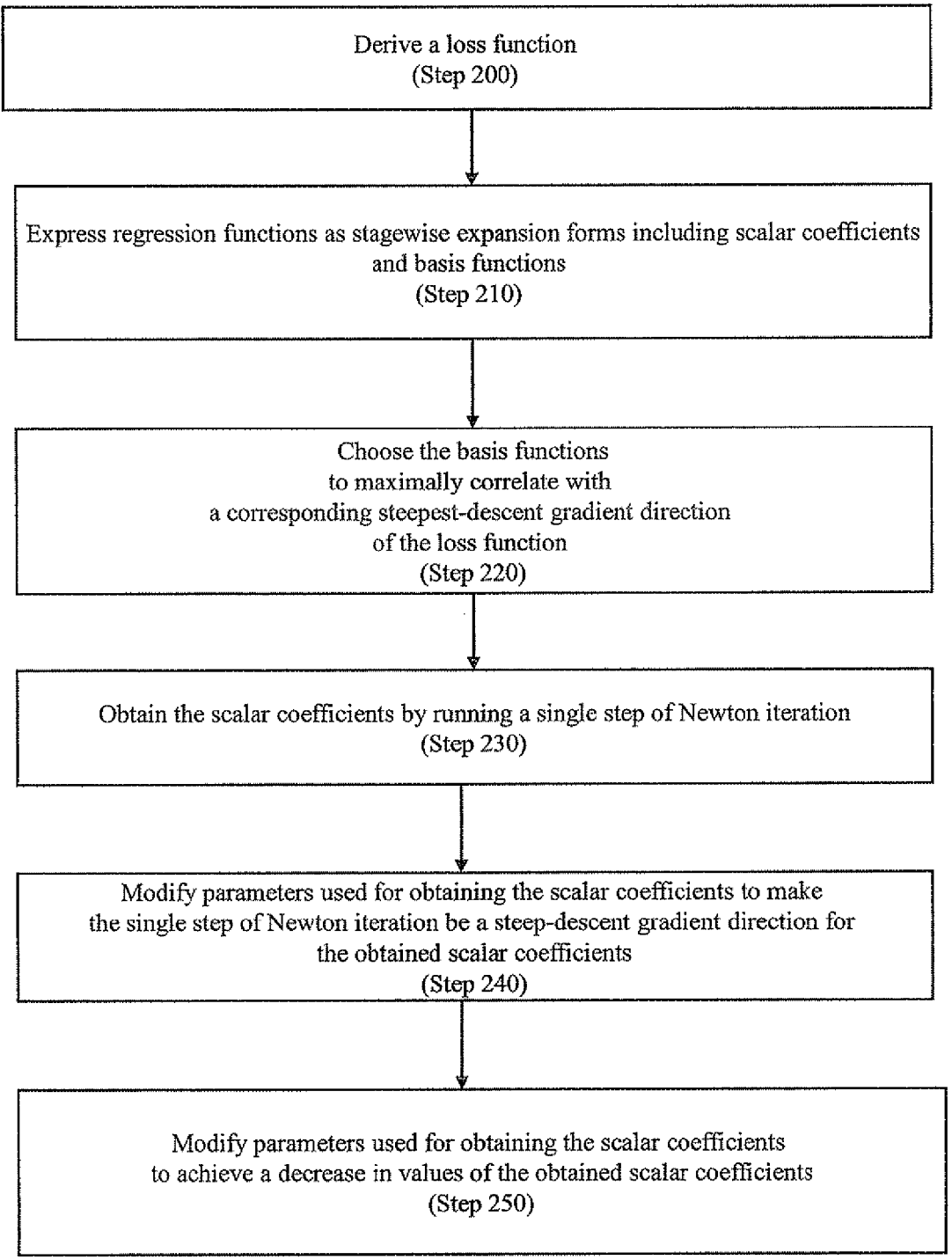
FIG. 2 illustrates a flow chart describing method steps for performing a joint modeling of a mean and dispersion by extending MART methodology according to one embodiment of the present invention.

FIG. 2 illustrates a flow chart describing method steps for joint modeling of a mean and dispersion by extending the MART methodology according to one embodiment of the present invention. At step 200, the computing system 1600 obtains a deviance loss function (e.g., a formula (30)). In one embodiment, a user may provide the deviance loss function to the computing system 1600. At step 210, the computing system 1600 represents regression functions for the mean and dispersion as a stagewise expansions, (expansions are functions that consists of sums of individual terms, and stagewise expansions are expansions whose terms are computed one by one, instead of all the terms simultaneously as is a case in many standard regression algorithms), which include the undetermined scalar coefficients and undetermined basis functions for each term. In the required extension to the MART methodology, the regression functions in the formula (31) are given by the stagewise expansion forms:

$$g(\mu_k)=\eta_k(x), h(\phi_k)=\zeta_k(z), \quad (55)$$

where, starting with offsets $\eta_0$ and $\zeta_0$, at each stage, the computing system 1600 computes $$\eta_{k+1}(x)=\eta_k(x)+a_{k+1}R(x, \beta_{k+1}), \zeta_{k+1}(z)=\zeta_k(z)+b_{k+1}S(z, \gamma_{k+1}), \quad (56)$$

In each stage, positive scalar coefficients $\{a_{k+1}, b_{k+1}\}$, and parameterized basis functions $R(x, \beta)$, $S(z, \gamma)$ are chosen so as to obtain a significant reduction in the loss function (30).

However, a simultaneous optimization of all these variables in the formula (56) is computationally challenging, and thus the following two-step algorithm is therefore used to develop a solution (i.e., a complete regression stage function with a determined scalar coefficients and a determined basis functions) at each stage. The basis function refers to an element of a particular basis (i.e., a set of vectors) for a function space (i.e., a set of functions). Every function in the function space can be represented as a linear combination of basis functions, just as every vector in a vector space can be represented as a linear combination of basis vectors.

Determination of the Stage Basis Functions

Returning to FIG. 2, at step 220, the computing system 1600 chooses the basis functions that maximally correlate with a corresponding steepest-descent gradient direction (i.e., a gradient method in which a choice of a direction is where a function f decreases most quickly, which is the direction opposite to a gradient of the function f) of the deviance loss function. At first, the parameters $\{\beta_{k+1}, \gamma_{k+1}\}$ for optimal basis functions in the formula (56) are estimated from $$\beta_{k+1} = \arg\min_\beta \sum_{i=1}^{n} \left[\left(-\frac{\partial l_i}{\partial \eta}\right)_k - R(x_i, \beta)\right]^2, \quad (57)$$

$$\gamma_{k+1} = \arg\min_\gamma \sum_{i=1}^{n} \left[\left(-\frac{\partial l_i}{\partial \zeta}\right)_k - R(z_i, \gamma)\right]^2. \quad (58)$$

where "arg min" denotes a value of an argument (e.g., $\beta$ in (57)) for which the function has the minimum value. As a result of (57) and (58), the basis functions $\{R(x, \beta_{k+1}), S(z, \gamma_{k+1})\}$ in the formula (56) are therefore chosen so as to be maximally correlated with a corresponding steepest-descent gradient direction of the loss function (30) evaluated at the previous stage in the expansion (56). In MART methodology, as described in Friedman, these basis functions are regression trees (i.e., function approximations in which a response is predicted over individual domains obtained by partitioning a space of covariate features) of fixed depth, computed using least-squares splitting criterion (57) and (58) (the least-squares splitting criterion is used to subdivide a given domain in a regression tree into two regions in a recursive manner, if in doing so, a mean-square deviation of a response in the domain is reduced), so that the parameters $\{\beta_{k+1}, \gamma_{k+1}\}$ represent covariate split conditions (i.e., a concatenation of all the conditions on a covariate that are used for a domain subdivision in the regression tree) and leaf node response estimates (i.e., mean values of a response in each subdomain in a final partitioning of a regression tree) in the respective regression trees. The use of regression trees obtained with the least squares criterion as the basis functions in the formula (56), is responsible for many attractive computational properties of the MART methodology, as well as for the present invention, as described further below.

The regression trees, which are chosen to be of small depth, typically either 1 or 2, are termed "weak learners". In particular, the use of regression trees of depth 1 corresponds to piecewise-constant, additive nonlinear regression functions for $\eta(x)$ and $\zeta(z)$. Similarly, the use of regression trees of depth larger than 1 (e.g., depth 2) correspond to piecewise-constant, additive nonlinear regression functions $\eta(x)$ and ζ(z), that incorporate first-order local interaction terms ("first-order" implying that these terms involve simple products of covariates, and "local" implying that these terms are used only a particular partition of the input covariate space, rather than globally throughout an input covariate space). The regression trees used in the regression functions R(x, β) and S(z, γ) can have different depths, which can provide additional modeling flexibility (for example, for the constant dispersion case, a tree of depth zero will suffice for S(z, γ)). A function is said to be piecewise-constant if it is locally constant in connected regions separated by a possibly infinite number of lower-dimensional boundaries. An additive function is a function that preserves an addition operation:

$$f(x+y)=f(x)+f(y)$$

for any two elements x and y in a domain. A regression function describes a relationship between a dependent variable y and explanatory variable(s) x.

Determination of the Expansion Coefficients

Returning to FIG. 2, at step 230, the computing system 1600 obtains the scalar coefficients, e.g., by running a single step of the Newton Iteration. After the $R(x, \beta_{k+1})$ and $S(z, \gamma_{k+1})$ have been computed from the formulas (57) and (58) as outlined above, the scalars $\{a_{k+1}, b_{k+1}\}$ are obtained from $$(a_{k+1}, b_{k+1}) = \arg\min_{(a,b)} \hat{L}_k(a,b), \tag{59}$$

where $$\hat{L}_k(a,b) = L(g^{-1}(\eta_k + aR(x,\beta_{k+1})), h^{-1}(\zeta_k + bS(z,\gamma_{k+1}))). \tag{60}$$

The formulas (59)-(60) represents a bivariate optimization problem, since it involves finding optimum values of two variates a and b, so that the function $\hat{L}_k(a,b)$ in (59)-(60) is minimized. Thus, a use of the Newton iteration is preferred since it is unaffected by a local geometry of an optimization surface (59) (i.e., a geometry of $\hat{L}_k(a,b)$ as a function of (a,b)), since this geometry can be quite poorly scaled in an initial stages of a stagewise procedure (56), whereas gradient line-search methods, in which values of (a,b) in a direction of a gradient of the function $\hat{L}_k(a,b)$ are examined to find optimum values, is sensitive to a relative scaling of optimization variables. A coupled optimization of the formula (59) for the variables $a_{k+1}$ and $b_{k+1}$ may be used, and particularly in a vicinity of an optimum where the Newton iteration has a rapid quadratic convergence. Quadratic convergence means that the error at a given iteration is proportional to the square of an error at the previous iteration. For example if an error is one significant digit at a given iteration, then at a next iteration it is two digits, then four, etc. After choosing the basis function and obtaining the scalar coefficients, the computing system 1600 completes the regression functions for the mean and dispersion based on the chosen basis function and the obtained scalar coefficients.

An important aspect of using the Newton iteration is that starting from an initial guess (a, b)=(0, 0), only a single Newton step is taken, rather than iterating the optimization (59) to convergence. This "early stopping" helps in avoiding over-fitting (over-fitting is a property of a regression function, when it fits the sample data with little or no error; such regression functions typically do very poorly with making predictions on unseen data, and these functions are also very sensitive to new sample data which can lead to drastic changes in the form of the regression function), to specific basis functions that appear in early stages of the stage-wise procedure (56), but without loss of overall accuracy, since any sub-optimal solutions for the formula (59) at a given stage will be corrected in subsequent stages of the overall stage-wise procedure (56). The single step of the Newton iteration to the formula (59) only requires an evaluation of derivatives of the formula (59) at (a, b)=(0, 0), $$(\nabla_a \hat{L})_k = \sum_{i=1}^n \left(\frac{\partial l_i}{\partial \eta}\right)_k R(x_i, \beta_{k+1}), \tag{61}$$

$$(\nabla_b \hat{L})_k = \sum_{i=1}^n \left(\frac{\partial l_i}{\partial \zeta}\right)_k S(z_i, \gamma_{k+1}),$$

$$(\hat{H}_{aa})_k = \sum_{i=1}^n \left(\frac{\partial^2 l_i}{\partial \eta^2}\right)_k R(x_i, \beta_{k+1})^2, \tag{62}$$

$$(\hat{H}_{bb})_k = \sum_{i=1}^n \left(\frac{\partial^2 l_i}{\partial \zeta^2}\right)_k S(z_i, \gamma_{k+1})^2,$$

$$(\hat{H}_{ab})_k = \sum_{i=1}^n \left(\frac{\partial^2 l_i}{\partial \eta \partial \zeta}\right)_k R(x_i, \beta_{k+1}) S(z_i, \gamma_{k+1}), \tag{63}$$

which should be used in conjunction with the formulas (32)-(35), so that $$\begin{bmatrix} a_{k+1} \\ b_{k+1} \end{bmatrix} = -\hat{\alpha} - \begin{bmatrix} (\hat{H}_{aa})_k + \hat{\lambda} & (\hat{H}_{ab})_k \\ (\hat{H}_{ba})_k & (\hat{H}_{bb})_k + \hat{\lambda} \end{bmatrix}^{-1} \begin{bmatrix} (\nabla_a \hat{L})_k \\ (\nabla_b \hat{L})_k \end{bmatrix}. \tag{64}$$

A choice $\hat{\alpha}=1$ and $\hat{\lambda}=0$ in the formula (64) yields a usual single step of the Newton iteration for the formula (59). However, particularly in initial stages of the stagewise procedure, an optimization geometry may be non-convex and the Hessian matrix in the formula (64) may not be positive-definite. Furthermore, even when the Hessian is positive-definite, the unmodified Newton step can occasionally lead to an increase rather than a desired decrease in an objective function (59). The parameters $\hat{\alpha}$ and β therefore incorporate two simple modifications to an usual Newton step (i.e., a single step of the Newton iteration) to ensure global convergence in nonlinear optimization.

Returning to FIG. 2, at step 240, the computing system 1600 performs a first modification. At the first modification, the computing system 1600 modifies parameters (e.g., $\hat{\alpha}$ and β) used for obtaining the scalar coefficients to let the single step of the Newton iteration be a steep-descent gradient direction for the obtained scalar coefficients. The first modification requires computing the eigenvalues of the 2×2 Hessian matrix in the formula (63), and in a semi-definite or indefinite case, the computing system 1600 sets $\hat{\lambda}=-(1+\delta)\hat{\lambda}_{min}$, where $\hat{\lambda}_{min} \leq 0$ is the smallest eigenvalue, and $\delta>0$ is a small positive constant, e.g., less than 10. This ensures that a modified Newton iteration matrix is positive-definite and well-conditioned, so that a modified Newton step is indeed a descent direction for the objective function (59).

Returning to FIG. 2, at step 250, the computing system 1600 performs a second modification. At the second modification, the computing system 1600 modifies parameters used for obtaining the scalar coefficients to achieve a decrease in values of the obtained scalar coefficients. The second modification involves selecting $0<\hat{\alpha}\leq 1$ to ensure that a size of a step in the descent direction from the modified Newton step leads to an actual decrease in the objective function (59), which is only guaranteed for the small enough $\hat{\alpha}$. Therefore, starting with an initial value of $\hat{\alpha}=1$ in the formula (64) which would be an unmodified Newton step, the objective function

(59) evaluated with this step and if the objective function is not sufficiently decreased according to a condition $$\hat{L}_k(\hat{\alpha} a_{k+1}, \hat{\alpha} b_{k+1}) \leq \hat{L}_k(0,0) - c_1 \hat{\alpha}(a_{k+1}(\nabla_a \hat{L})_k + b_{k+1}(\nabla_b \hat{L})_k), \quad (65)$$

then the value of $\hat{\alpha}$ is successively halved till a desired condition (i.e., the obtained scalar coefficients reaches a desirable values) is satisfied (the constant value c1 in (65) must satisfy $0 < c_1 < 1$, e.g., $c_1 = 10^{-4}$). This choice of $\hat{\alpha}$ ensures that the largest possible modified Newton step is taken that consistent with a sufficient decrease in the objective function (59) in this stage. Then, based on the modified parameters (e.g., modified $\hat{\alpha}$ and $\beta$), the computing system 1600 recalculates the scalar coefficients based on the formula (64). Then, the computing system 1600 obtains complete regression functions for the mean and dispersion based on the chosen basis function and the recalculated scalar coefficients.

Optimum Number of Stages in Expansion

An optimum number of stages in the expansion (56), denoted by K, is obtained from the cross-validation estimate of the loss $$K = \arg\min_k \sum_{I=1}^{N_{cv}} L_{\{-I\}}(\mu_k^{\{I\}}, \phi_k^{\{I\}}), \quad (66)$$

Where $\mu_k^{\{I\}}$, $\phi_k^{\{I\}}$ denote the mean and dispersion estimates respectively at the k'th stage from training data for the I'th fold, and $L_{\{-I\}}(\mu_k^{\{I\}}, \phi_k^{\{I\}})$ denotes a loss function for test data in the I'th fold at the k'th stage. The number of cross-validation folds $N_{cv}$ is typically 5 or 10. Other criteria such as the 1-SE rule, in which the K is the smallest number of stages for which the cross-validation loss is within 1 standard error of a minimum cross-validation loss, can also be used as an alternative to the formula (66).

MART Implementation

For mean regression modeling, MART methodology leads to competitive, highly robust and interpretable procedures, and many of its advantages readily extend to the joint modeling of the mean and dispersion discussed supra. In particular, the use of basis functions comprised of regression trees, which is fitted using the least squares criterion to responses comprised of the steepest-descent gradient directions of the stagewise loss function, provides a systematic and modular approach to a stagewise computation, that is independent of a specific form of an overall loss function.

In particular, the use of the least-squares fitting criterion for the regression trees is computationally desirable, since the this criterion can rapidly estimated using updating procedures while searching through a sequence of possible tree splits for an optimal split.

Another important benefit of the use of the least-squares fitting criterion arises in a treatment of categorical covariate splits, where a convexity of the least-squares splitting criterion ensures that if $\Omega$ is a cardinality of a categorical covariate, then the best split in this covariate can be found in just $O(\Omega)$ steps, without having to search through the space of all possible splits which would require $O(2^\Omega)$ steps. An ability to evaluate categorical splits in a linear rather than exponential number of steps allows categorical features of high cardinality to be used in the regression modeling without requiring any preprocessing and/or grouping of category levels in these features for computational tractability in a fitting procedure. In contrast, regression trees that directly use the overall loss function as the splitting criterion may not have this useful property (i.e., not requiring preprocessing and grouping) for categorical covariates, from the formula (9) relevant loss functions may not always be convex in a mean regression, and are certainly non-convex in the joint regression of the mean and dispersion.

The use of regression trees as basis functions in the stagewise expansion is useful for high-dimensional data sets with numerous input covariates. Since an intrinsic dimensionality of the regression response surface is likely to be much smaller than the actual dimension of the input covariate space, a greedy feature selection that is used in the regression trees ensures that collinear and irrelevant covariates are excluded from regression models, so that there is no need to explicitly incorporate a separate feature selection step in a computational procedure.

An ability of the regression functions to model low-order interaction effects in the covariates can be achieved by using regression trees with depth greater than 1, for example depth 2 or 3, since in practice, it is the low-order interaction effects are typically the most important in the regression modeling. However, from a model interpretation point of view, the use of regression trees of depth of 1 has an advantage that it yields a regression function that is additive in the effects of individual covariates, so that it is possible to separate out effects of individual covariates in a final model.

Numerical Studies

It is difficult to find non-trivial data sets for a detailed study of distributional and heteroscedasticity effects in regression modeling. For most real-world data sets, many competing regression models provide reasonable fits and consistent interpretations, and therefore in order to illustrate relevant algorithmic issues, one embodiment of the present invention has also considered a few synthetic data sets with known response characteristics in order to explicate some of the computational results presented below.

Synthetic Data Sets

A response variable in this collection of synthetic data sets is always generated from a specific distribution with given mean and dispersion dependencies on the covariates. The present invention can then be evaluated in terms of both identifying a correct response model, and recovering a known signal from the data.

The synthetic data sets in one implementation comprises of 1,000 samples each for training and validation. A covariate set is 6-dimensional, $x = \{x_1, x_2, \ldots, x_6\}$, where $x_1, x_2, x_3$ are continuous-valued and uniformly sampled in an interval (0, 1), and $x_3, x_4, x_5$ are categorical-valued with 4 levels denoted $\{1, 2, 3, 4\}$ respectively which are sampled with equal probability. A response is given by $y = Tw_p(\mu(x), \phi(x))$ where p=0, 2, 3, Tw denotes the Tweedie distribution, and the mean and dispersion are given functions of the covariates. In these data sets of this example implementation, the mean is an additive, nonlinear function of a form:

$$\mu(x) = 7 + 10(x_1 - 0.5)^2 - x_2 + \sin 2\pi x_2 - 3x_3 + 1.5I(x_4). \quad (67)$$

where I denotes an indicator function described in "Adaptive nonparametric estimation of mean and variance functions", D. Chan, et al., Computational and Graphical Statistics, Vol. 15(4), pp. 915-936, 2006, wholly incorporated by reference as if set forth herein, hereafter "Chan".

A first collection of synthetic data sets, termed SYNTH1, are generated with a constant dispersion $\phi(x) = c$ for a response, with c being chosen to achieve a signal-to-noise ratio between 1 and 2 (for the Normal distribution, a simulated response is checked to ensure strictly positive values, so that non-normal loss functions can be used for model exploration and comparison).

TABLE 1

Validation set loss estimate $L_v$ for SYNTH1 data set, with regression tree depths l = 1 for the mean and k = 0 for the dispersion. The estimated standard errors are negligible and have been omitted for brevity.

| | Loss Function | | |
|---|---|---|---|
| Response | Normal | Gamma | Inverse Gaussian |
| $N(\mu(x), 0.6)$ | <u>1.290</u> | 1.376 | 1.575 |
| $Ga(\mu(x), 0.08)$ | 2.100 | <u>2.000</u> | 2.042 |
| $Ga(\mu(x), 1.0)$ | 3.386 | 2.895 | 7.749 |
| $IG(\mu(x), 0.005)$ | 1.728 | <u>1.604</u> | 1.628 |
| $IG(\mu(x), 0.2)$ | 3.661 | 2.916 | <u>2.789</u> |

For example, in the Table 1, a response is generated from the Normal, Gamma and Inverse Gaussian distributions, and is fitted using all three loss models. In all cases, the model fits use an identity link for the mean sub-model (i.e., a regression function of the mean) and a log-link for the dispersion sub-model (i.e., a regression function of the dispersion). Results indicate that a "correct" loss model typically yields the lowest validation set loss estimate, and an examination of the model fit indicates a consistent signal recovery in each case. For small c, an identification of the correct model can be confounded (as can be noticed in the case of Gamma and Inverse Gaussian distributions) in the Table (1), but for larger c, a correct loss model also provides the best model fit. A link function is a function that links a model specified in a design matrix, where columns represent beta parameters and rows represents real parameters. Then, the corresponding log link function may be real parameters=exp(X*beta parameters), where X is a random variable.

These results illustrated in the Table 1 also demonstrate a utility of the joint modeling, even in a constant dispersion case, since alternative models for the conditional response can be compared, which is not the case if only the deviance loss function were used.

TABLE 2

Validation set loss estimate $L_v$ for SYNTH1 data set for the response given by $N(\mu(x), 0.6)$ for varying regression tree sizes (l, k).

| | Stump depths (l, k) | | | | |
|---|---|---|---|---|---|
| | (1, 0) | (1, 1) | (2, 0) | (2, 1) | (2, 2) |
| $L_V$ | <u>1.317</u> | 1.393 | 1.386 | 2.588 | 69.77 |

The table 2 considers the data set for Normal-distributed response case in conjunction with the Normal loss function (i.e., a loss function in a case of Normal distribution) for a model fit, and describes an effect of varying regression tree sizes in the mean and dispersion sub-models. The best model accuracy is obtained with trees of depth (1, 0), which are the simplest basis functions consistent with the assumed covariate effects (i.e., dependence of an assumed regression function on covariates in the data set) in the synthetic data. A use of more complex basis functions in this case (i.e., Normal distribution case), leads to over-fitting effects in individual stages, with an overall sub-optimal solution for a gradient boosting expansion (i.e., a machine learning algorithm for fitting a weighted additive expansion of simple trees to training data).

A second collection of data sets, termed SYNTH2, uses data generated for a variable dispersion case with a dispersion sub-model of a form $$\phi(x) = c_1 I_1(x_4) + c_2 I_2(x_4). \quad (68)$$

where $I_1$ is a first indicator function described in "Modeling Variance Heterogeneity in Normal Regression Using GLM", App. Statist, Vol. 36(3), pp. 332-339 (1987), wholly incorporated by reference as if set forth herein and $I_2$ is a second indicator function described in Chan.

TABLE 3

Validation set loss estimate $L_V$ for SYNTH2 data set fitted with a consistent loss model for a simulated response with results for varying tree depths (l, k). Estimated standard errors are negligible and excluded for brevity.

| | $L_V$ | | |
|---|---|---|---|
| Stump depths | Normal ($c_1 = 0.2$, $c_2 = 2.0$) | Gamma ($c_1 = 0.08$, $c_2 = 1.0$) | Inverse Gaussian ($c_1 = 0.08$, $c_2 = 0.8$) |
| l = 1, k = 0 | 1.598 | 2.822 | 2.810 |
| l = 1, k = 1 | <u>1.421</u> | <u>2.566</u> | 2.655 |
| l = 2, k = 0 | 1.661 | 2.876 | 2.817 |
| l = 2, k = 1 | 1.490 | 2.597 | <u>2.634</u> |
| l = 2, k = 2 | 1.587 | 2.596 | 2.660 |

The table 3 describes for various response distributions, an effect of varying tree depths in respective fitted models in a variable dispersion case, when a "correct" loss function is used for a model fit. For all three response distributions (i.e., Normal, Gamma and Inverse Gaussian), a choice k=1 yields the best model fit, and this is also the simplest basis function that is consistent with an assumed piecewise-constant variation in the synthetic data.

Sniffer Data Set

A Sniffer data set, described in "Generalized Linear Models With Varying Dispersion", G. K. Smyth, et al., Royal Statist. Soc. B., Vol. 51(1), pp. 47-60, 1989, wholly incorporated by reference as if set forth herein, can be used to model an amount y of hydrocarbon vapors escaping from a gasoline tank during filling, using four continuous explanatory variables, viz., respective temperatures ($x_1$ and $x_2$) and vapor pressures ($x_3$ and $x_4$) of an original and dispensed gasoline in the tank. This data set, which comprises of 125 measurement records, can be obtained from http://www.statsci.org/data/general/gasvapor.html.

TABLE 4

Cross-validation loss estimates (with standard errors in brackets) for the Sniffer Data Set using various response distributions with different tree depths for the mean (l) and dispersion (k).

| loss function | (l, k) = (1, 0) | (l, k) = (1, 1) | (l, k) = (2, 1) |
|---|---|---|---|
| | Identity link | | |
| Normal | 2.838 (0.184) | 3.231 (0.18) | 3.227 (0.093) |
| Gamma | 2.660 (0.119) | 3.056 (0.254) | 2.815 (0.132) |
| Inverse Gaussian | 2.558 (0.104) | 2.968 (0.084) | 2.735 (0.123) |
| | Canonical link | | |
| Normal | 2.838 (0.184) | 3.231 (0.18) | 3.231 (0.18) |
| Gamma | 2.770 (0.137) | 3.209 (0.099) | 3.169 (0.050) |
| Inverse Gaussian | 2.642 (0.110) | 2.949 (0.221) | 2.798 (0.096) |

The table 4 illustrates cross-validation estimates of the negative log-likelihood for heteroscedastic modeling (i.e., modeling to have different variances) using the present invention. (The cross-validation is a way to predict a fit of a model to a hypothetical validation set when an explicit validation set is not available. The cross-validation estimate is an out-of-sample estimate.) A use of different tree sizes l and k for the mean and dispersion sub-models allows different levels of interaction effects to be incorporated into the corresponding regression functions. These results suggest that a response variance increases with the mean. The table 4 demonstrates that the Normal model in which possible variable dispersion can be incorporated (i.e., for k=1) is not suitable, nor is a case when the mean sub-model incorporates possible first-order interaction terms (i.e., for k=2). In fact, the best model fit is obtained with the Inverse Gaussian response in a constant dispersion case (independent of whether an identity link or a canonical squared-reciprocal link for this distribution was used in a mean regression model). The training set negative log-likelihood for the model with l=1, k=0 was 2.32.

Synthetic Insurance Data Set

These synthetic insurance data sets are based on a Canadian Auto Insurance data set of "Two studies in automobile insurance ratemaking", R. A. Bailey, et al, ASTIN Bulletin, Vol. 1, pp. 192-217, 1960, wholly incorporated by reference as if set forth herein, (see http://www.statsci.org/data/general/carinsca.html), hereinafter "Bailey", which includes aggregated claim frequency and claims cost data as a function of 2 covariate rating factors, viz., Merit (with 4 levels) and Class (with 5 levels), for a total of 20 cells. The web site also describes GLM fits for both claims frequency (using Poisson regression) and claims cost (using Gamma regression) for models incorporating main effects (i.e., individual terms for each covariate in an assumed form of the regression function). Synthetic data sets for heteroscedastic modeling are generated using a mean dependence relationship on the covariates from those GLM fits, along with some assumed variable dispersion dependence relationship in terms of covariate rating factors (i.e., individual levels in a Merit and Class covariate features in the Insurance data set).

A procedure for generating individual claim records in the synthetic data sets is as follows. For each claim record, a rating factor combination, which is a combination of a Merit and a Class rating factor, is selected based on an observed cell frequency (i.e., the number of observations of specified conditional constraints on one or more variables) of insured claims in Bailey. The GLM model estimates for the rating factor combination are then used to generate a Poisson random variate (i.e., random variable in Poisson distribution) for a claim frequency, and Gamma random variates (i.e., random variable in Gamma distribution) for a claim cost for each of these individual claims are generated using an assumed Gamma dispersion parameter estimate (i.e., estimating a dispersion parameter ($\phi$) in Gamma distribution) for the cell. A collection of non-zero claim frequency records in this synthetic data set is then used for heteroscedastic Gamma regression modeling (i.e., predicting one variable from one or more random variables in Gamma distribution, where the one or more random variables have different variance(s)), with a cost per claim being the response variable (i.e., an output of the heteroscedastic Gamma regression modeling), and the number of claims being a case weight, which multiplies a corresponding deviance term in the loss function.

An assumed dispersion model for a Gamma random variate generation (i.e., generating a random variable suitable for Gamma distribution) is given by $$\phi(x) = c_1 I_1(\text{Class}) + c_2 I_2(\text{Class}), \quad (69)$$

so that a dispersion is a constant $c_1$, except in the cells with a rating factor Class=4, $c_2$ is another constant.

TABLE 5

Validation set loss estimates (with standard errors in brackets) for modeling claims costs using heteroscedastic Gamma regression for a synthetic insurance data set with a level of dispersion heterogeneity being varied for a same mean response ($N_{Tr}$ denotes the number of training data records).

| | $c_1 = 0.5, c_2 = 1.0$ | | $c_1 = 0.5, c_2 = 2.0$ | |
| --- | --- | --- | --- | --- |
| $N_{Tr}$ | (l, k) = (1, 0) | (l, k) = (1, 1) | (l, k) = (1, 0) | (l, k) = (1, 1) |
| 500 | −0.279 (0.027) | −0.293 (0.024) | −0.222 (0.038) | −0.234 (0.032) |
| 1000 | −0.308 (0.030) | −0.325 (0.027) | −0.222 (0.042) | −0.293 (0.031) |
| 2000 | −0.305 (0.029) | −0.328 (0.026) | −0.229 (0.040) | −0.290 (0.031) |

Results shown in Table (5) are all obtained using the log-link for both the mean and dispersion sub-models. Two different pairs of values for ($c_1$, $c_2$) are considered and in each case 3 training data sets containing roughly 50, 100 and 200 records respectively were used, along with a same validation data set containing roughly 1,000 records.

The table 5 shows that it is possible to discern variations in the dispersion parameter by comparing constant dispersion models (k=0) with variable dispersion models (k=1). For smaller contrasts in the dispersion heterogeneity (e.g., in the case $c_1$=0.5, $c_2$=1.0), larger training data sets are required to elicit the variable dispersion effects in a regression model.

According to one embodiment of the present invention, an extension of the MART methodology to joint modeling of a mean and dispersion takes into account a fact that the mean and dispersion sub-models cannot be estimated independently, but are tightly coupled through the likelihood formulation.

The conditional response distributions considered in one embodiment of the present invention, viz., the Normal, Gamma and Inverse Gaussian, are members of an exponential dispersion family for which the negative log-likelihood has a special form, e.g., the formula (12). However, an overall methodology can also be used for other conditional response distributions in the small dispersion limit $\phi \rightarrow 0$, for which a leading-order term of the saddle-point approximation to the negative log-likelihood also has the form (11).

In real data sets (as opposed to simulated data sets), it is often a case that a choice of basis functions for the mean regression cannot capture a variation in a true mean, and a resulting systematic departures in the regression model for the mean can lead to a spurious inference of variability in the dispersion sub-model. A careful cross-validation analysis, along with an examination of model fits using different tree sizes in stage basis functions, may be required in order to rule out such spurious inferences.

For a mean regression modeling, the MART methodology has certain advantages over the GLM and other comparable regression methods, and these advantages carry over to the joint regression modeling case that one embodiment of the present invention implements. For example, the adaptive, non-parametric (i.e., being non-parametric means that the number and nature of parameters are flexible and are not fixed) regression functions in the present invention makes it possible to easily capture additive nonlinear effects as well as low-order covariate interaction effects in the regression modeling. The present invention is unaffected by the presence of collinear covariates, or by noise covariates, both of which are commonly encountered in high-dimensional data sets in applications such as insurance. Furthermore, in contrast to the GLM and other comparable methods, the present invention easily incorporates high-cardinality categorical covariates in the regression modeling without requiring any preprocessing or grouping of feature levels in order to reduce feature cardinality for tractable computational modeling.

In one embodiment, the method steps in FIGS. 1-2 are implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the method steps in FIGS. 1-2 are implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip operates the method steps described in FIGS. 1-2.

Figure 3:
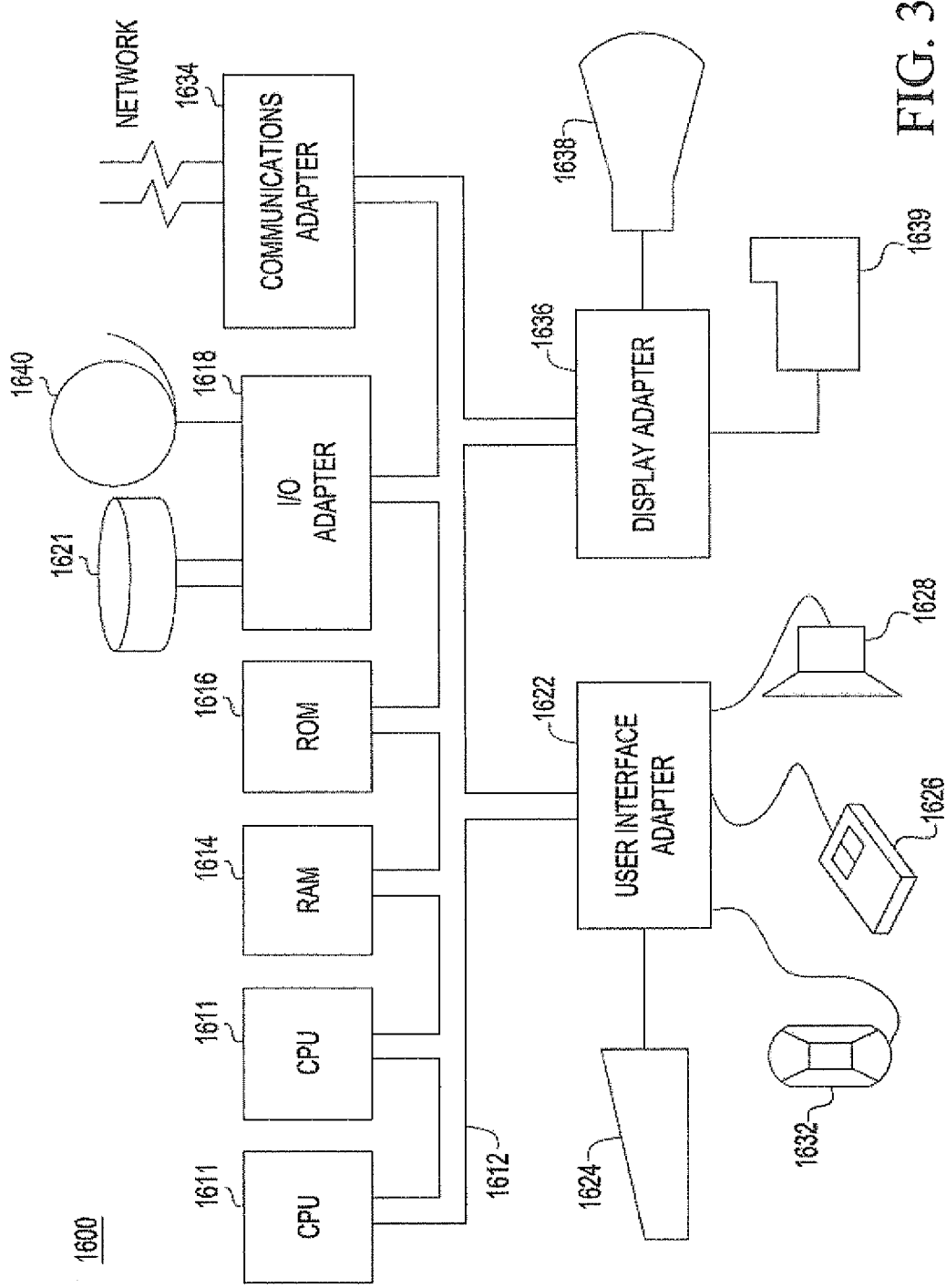
FIG. 3 illustrates an exemplary hardware configuration used for operating method steps described in FIG. 1 and/or FIG. 2 according to one embodiment of the present invention.

FIG. 3 illustrates an exemplary hardware configuration of a computing system 1600 running and/or implementing the method steps in FIGS. 1-2. The discovery manager 220, the NLDST 230 and/or the MCDT 240 may also be implemented on the hardware configuration illustrated in FIG. 3. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a local area network (LAN), etc., and a display adapter 1636 for connecting the bus 1612 to a display device 1638 and/or printer 1639 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for modeling of original insurance data in an insurance industry, the system comprising:
   a memory device;
   a processor coupled to said memory device,
   wherein said processor is configured to perform steps of:
      deriving a non-convex loss function characterized over the original insurance data, the derived loss function optimized to a multi-dimensional calculation that involves a matrix calculation;
      representing regression functions for the mean and the dispersion as stagewise expansion forms, the stagewise expansion forms including undetermined scalar coefficients and undetermined basis functions;
      determining the basis functions that maximally correlate with a corresponding steepest-descent gradient direction of the derived loss function;
      obtaining the scalar coefficients based on a single step of multi-dimensional Newton iteration involving a matrix calculation;
      making the single step of the multi-dimensional Newton iteration to be a multi-dimensional steep-descent gradient, which involves a matrix calculation, for the obtained scalar coefficients;

completing the regression functions based on the determined basis functions and the obtained scalar coefficients; and concurrently estimating, based on the completed regression functions, the mean value and the dispersion value of the original insurance data.

2. The system according to claim 1, wherein said processor is further configured to perform steps of:

modifying parameters used for said obtaining said scalar coefficients.

3. The system according to claim 1, wherein said determined basis functions are regression trees computed using a least-square splitting criterion.

4. The system according to claim 1, wherein the obtained scalar coefficients causes a reduction in the derived non-convex loss function.

5. The system according to claim 1, wherein the single step of multi-dimensional Newton iteration avoids over-fitting to the determined basis function.

6. A computer program product for modeling of original insurance data in an insurance industry, the computer program product comprising a non-transitory storage medium readable by a processing circuit and storing instructions run by the processing circuit for performing a method, said method steps comprising:

deriving a non-convex loss function characterized over the original insurance data, the derived loss function optimized to a multi-dimensional calculation that involves a matrix calculation;

representing regression functions for the mean and the dispersion as stagewise expansion forms, the stagewise expansion forms including undetermined scalar coefficients and undetermined basis functions;

determining the basis functions that maximally correlate with a corresponding steepest-descent gradient direction of the derived loss function;

obtaining the scalar coefficients based on a single step of multi-dimensional Newton iteration involving a matrix calculation;

making the single step of the multi-dimensional Newton iteration to be a multi-dimensional steep-descent gradient, which involves a matrix calculation, for the obtained scalar coefficients;

completing the regression functions based on the determined basis functions and the obtained scalar coefficients; and concurrently estimating, based on the completed regression functions, the mean value and the dispersion value of the original insurance data.

7. The computer program product according to claim 6, wherein said method further comprises:

modifying parameters used for said obtaining said scalar coefficients.

8. The computer program product according to claim 6, wherein said determined basis functions are regression trees computed using a least-square splitting criterion.

9. The computer program product according to claim 6, wherein the obtained scalar coefficients causes a reduction in the derived non-convex loss function.

10. The computer program product according to claim 6, wherein the single step of multi-dimensional Newton iteration avoids over-fitting to the determined basis function.

* * * * *